(12) United States Patent
van Everdingen

(10) Patent No.: US 7,061,864 B2
(45) Date of Patent: Jun. 13, 2006

(54) METHOD AND A DEVICE FOR CONTROLLING SOURCE SPECIFIC DATA FLOW

(75) Inventor: Michiel van Everdingen, Naarden (NL)

(73) Assignee: Lucent Technologies Inc., Murray Hill, NJ (US)

(*) Notice: Subject to any disclaimer, the term of this patent is extended or adjusted under 35 U.S.C. 154(b) by 979 days.

(21) Appl. No.: 09/971,514

(22) Filed: Aug. 31, 2001

(65) Prior Publication Data

US 2002/0031091 A1    Mar. 14, 2002

(30) Foreign Application Priority Data

Sep. 11, 2000    (EP) ................................. 00307841

(51) Int. Cl.
*H04L 12/24*    (2006.01)
(52) U.S. Cl. ..................... 370/233; 370/235; 370/252
(58) Field of Classification Search ............... 370/229, 370/230, 230.1, 231, 232–235, 252, 253, 370/400, 401; 709/223–225, 232, 233
See application file for complete search history.

(56) References Cited

U.S. PATENT DOCUMENTS

| | | | | |
|---|---|---|---|---|
| 5,280,470 A | * | 1/1994 | Buhrke et al. | 370/232 |
| 5,313,454 A | * | 5/1994 | Bustini et al. | 370/231 |
| 5,400,329 A | * | 3/1995 | Tokura et al. | 370/232 |
| 5,666,353 A | | 9/1997 | Klausmeier | 370/230 |
| 5,905,870 A | | 5/1999 | Mangin | 395/200.64 |
| 6,298,042 B1 | * | 10/2001 | Murase et al. | 370/235 |
| 6,813,245 B1 | * | 11/2004 | Furuno | 370/236 |
| 6,826,147 B1 | * | 11/2004 | Nandy et al. | 370/229 |

FOREIGN PATENT DOCUMENTS

| WO | WO 00/00899 | 1/2000 | ....................... 13/0 |
|---|---|---|---|
| WO | WO/00/77980 | 12/2000 | ....................... 12/0 |

OTHER PUBLICATIONS

Gigabit Ethernet Full-Duplex Repeaters by B. MacLeod, 1997 pp. 504 and 505.
EtheReal: A Host-Transparent Real-Time Fast Ethernet Switch by S. Varadarajan, 1998 pp. 12-21.

* cited by examiner

*Primary Examiner*—Ricky Q. Ngo
*Assistant Examiner*—Duc Duong

(57) ABSTRACT

A method for controlling data flow including: measuring an source specific incoming data rate of one source; comparing the source specific incoming data rate with a corresponding predetermined data rate; if the source specific incoming data rate exceeds the predetermined data rate, eliminating incoming data packets for reducing the source specific incoming data rate to be smaller than the predetermined data rate, if the source specific incoming data rate does not exceed the predetermined data rate, transmitting the incoming data packets to switching means, connected to said input port, characterised in that a backpressure warning signal (bpws) is generated if the source specific incoming data rate exceeds at least one of the at least one predetermined data rates and said generated backpressure warning signal is sent to a source of the incoming data packets. Hereby further transmission of data packets is prevented.

23 Claims, 2 Drawing Sheets

METHOD AND A DEVICE FOR CONTROLLING SOURCE SPECIFIC DATA FLOW

CROSS REFERENCED TO RELATED APPLICATION

This application claims priority of European Application No. 00307841. filed on Sep. 11, 2000.

FIELD OF THE INVENTION

The invention relates to data networks, and more particularly to methods and apparatus for controlling source generated data flow.

BACKGROUND OF THE INVENTION

In a data network (at least) two parties are involved: the user who wants to transport data and the service provider who is responsible for transporting the data towards the intended destination. In many cases a Service Level Agreement (SLA) between the user and the service provider specifies to what extent the user can use the network of the service provider. To protect the network of the service provider and to allow for fair sharing of the network resources between different users, it is common practice to mention a Peak Information Rate (PIR) in this SLA. The user is only allowed to send data at a rate up to this PIR.

A method and device for implementing such a policy are known from Kowalk, W; Lehnert, R. "*The 'policing function' to control user access in ATM networks-definition and implementation-*", International Symposium on Subscriber Loops and Services, IEEE September 1988 p. 240–245.

In this 'Kowalk' article, a method is described whereby the entrance of a switching device used in an ATM network is monitored for each separate source or user. If a source specific incoming data rate exceeds a predetermined data rate, the incoming data packets are discarded and the incoming data packets are transmitted through the switching device only if the source specific incoming data rate is below the predetermined data rate. Incoming data packets are also eliminated if the switching device becomes congested, that is if the incoming data flow (the total added source specific incoming data rates) exceeds the transport capacity of the switching device.

This is disadvantageous because in case of congestion of the switching device or if the source specific incoming data rate exceeds the predetermined data rate, source specific incoming data is eliminated and thereby lost. This causes errors in the sent data.

SUMMARY OF THE INVENTION

It is therefore an object of the present invention to minimize the aforementioned disadvantages of the prior art.

In accordance with an aspect of the the invention, a method for controlling the data flow is provided which is characterised in that a backpressure warning signal (bpws) is generated if the source specific incoming data rate exceeds a predetermined data rate and said generated bpws is sent to a source of the incoming data.

Such a warning signal warns the source of the data packets if the source specific incoming data rate exceeds the predetermined data rate or the switching device becomes congested. Sending of a bpws is a known method to signal that the switching device becomes congested. According to an aspect of the invention, the bpws also warns an individual sender of incoming data packets that his data rate exceeds the predetermined data rate. After receiving an bpws the sender may stop generating data and the need to eliminate incoming data packets is avoided According to a further aspect of the invention, there is provided a control device for controlling data flow, including one or more input ports, one or more meter devices connected to the input ports for comparing a source specific incoming data rate with a predetermined contract rate, one or more output port, and at least one backpressure warning signal generator device connected to the input port and the meter device. The backpressure warning signal generator device is adapted to transmit a backpressure warning signal (bpws) to a source of the incoming data if the source specific incoming data rate exceeds a predetermined contract rate. The control device may be used to implement the method mentioned above.

According to a further aspect of the invention, there is provided switching device adapted for use with the control device. A switching device of this type is particularly suitable for use in conjunction with a method according to the invention, because in a switching device, data from a number of sources is received and further transmitted, while such a device or any of the output ports may easily become congested. Therefore, control of data flow is critical to the switching device performance.

BRIEF DESCRIPTION OF THE DRAWINGS

These and other features of the invention will be best understood by reference to the following detailed description of one or more exemplary embodiments of the invention, taken in conjunction with the accompanying drawings, in which.

DETAILED DESCRIPTION OF THE EXEMPLARY EMBODIMENTS

Figure 1:
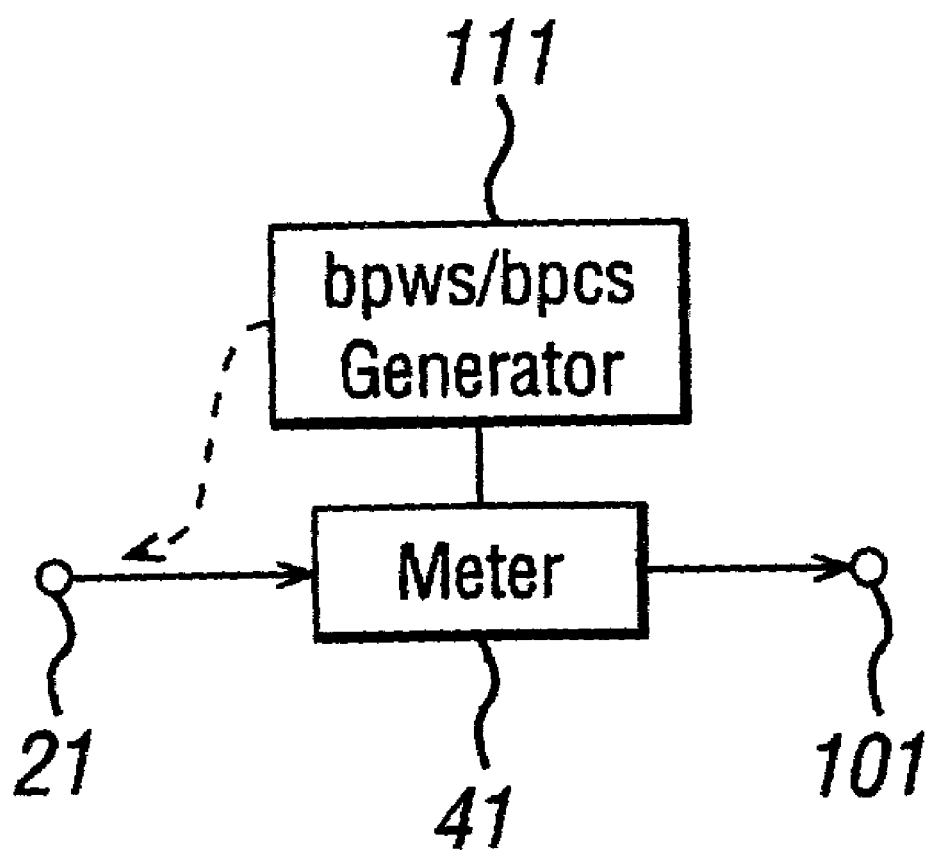
FIG. 1 diagrammatically shows an example of a control device able to perform a method according to an aspect of the invention.

FIG. 1 diagrammatically shows, by way of example only, a control device, able of sending a backpressure warning signal (bpws) and a backpressure clearance signal (bpcs). The examplary control device includes an input port 21, an output port 101, a meter device 41 and an bpws/bpcs generator 111. The meter device has predetermined data rates stored in memory means. The meter device 41 compares the source specific incoming data rate with a predetermined data rate corresponding with this specific source. If the incoming data rate exceeds this predetermined data rate or if the transport capacity of the meter is exceeded, the meter device 41 activates the bpws/bpcs generator 111 to send a bpws to the source of the data. Some time after sending the bpws, the bpws/bpcs generator 111 sends a bpcs to notify the source that data transmission may be initiated again. The bpcs might for example be sent if the incoming rate has dropped below the predetermined rate or a pre-set time period after sending the bpws has elapsed.

The nature of the backpressure warning signal bpws and backpressure clearance signal bpcs depends on the type of connection to the source. The connection may be full-duplex, that is, data can simultaneously be sent to and from the source, or half-duplex, which means that data can be sent to and from the source but only one way at the time.

In the full-duplex case, the bpws as well as the bpcs can be control signals. For example, bpws and bpcs can be the PAUSE signal as defined for Ethernet in IEEE 802.3d (annex 31B). Such a PAUSE signal can notify the sender to stop sending data packets towards the switching device that generated the PAUSE signal. Note that it is possible to send two distinct PAUSE signals for bpws and for bpcs. Alternatively, it is also possible to send one PAUSE signal to indicate both bpws and bpcs.

In the latter case, the time of the bpcs is known at the time the bpws is generated, because the PAUSE signal includes a time field indicating a time interval between bpws and bpcs. Since data can be sent in both directions simultaneously, it is still possible for the source to send incoming data packets. However, since the source is notified that his data packets will be discarded, the source will stop sending data in order to prevent errors in the sent data.

In the half-duplex case, sending a signal to the sources automatically blocks or jams the connection since it can only be used in one way at a time. It is possible to continue sending a signal as long as there is a necessity to eliminate incoming data packets, thereby preventing the source from sending incoming data packets. Thus the bpws is in fact starting a jamming signal and the bpcs in fact stopping sending of this jamming signal.

It should be apparent that embodiments constructed according to aspects of the invention can be applied in any type of connection allowing communication in a direction opposite to the direction of the data flow.

Figure 2:
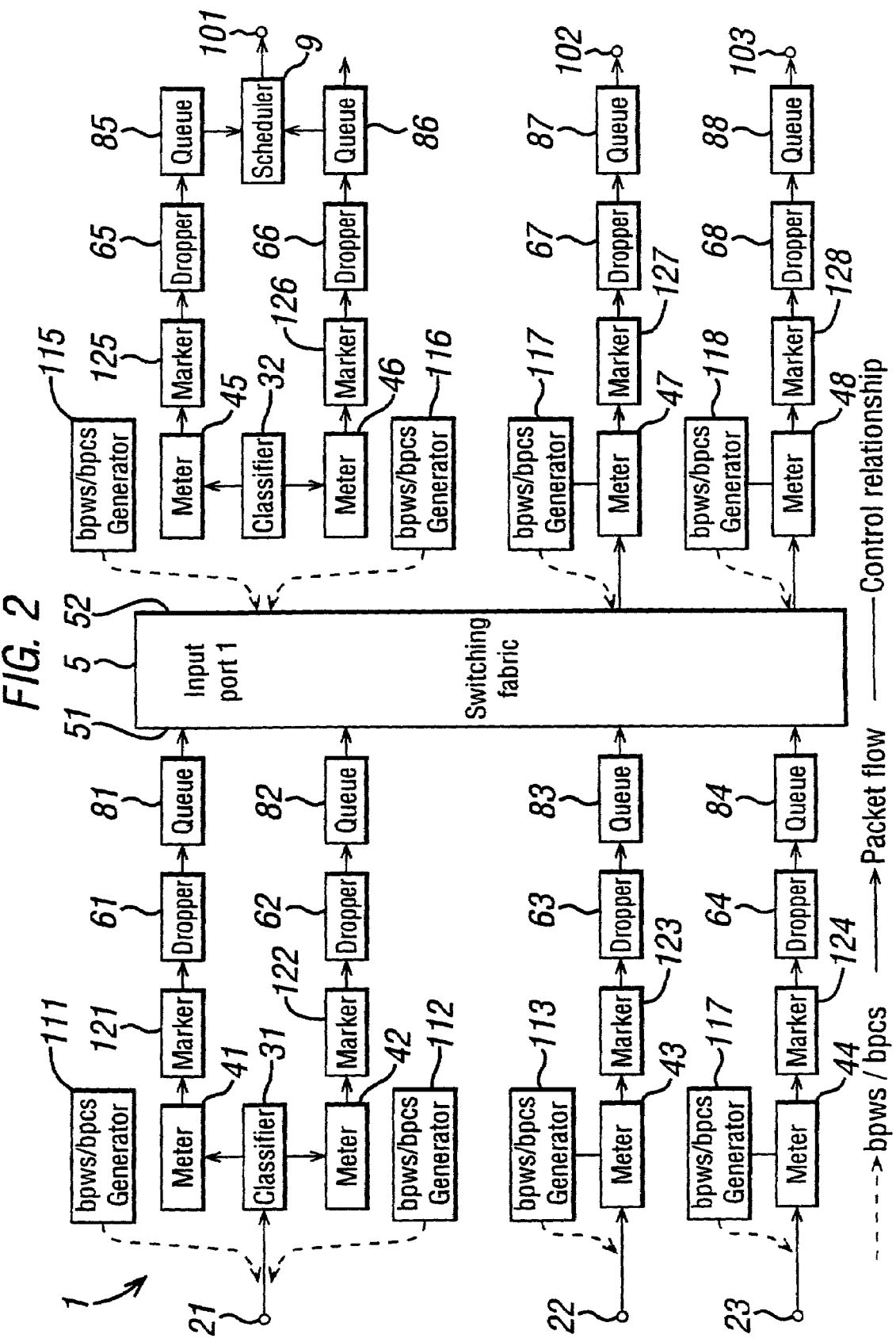
FIG. 2 diagrammatically shows an example of a switching device provided with the meter device shown in FIG. 1.

FIG. 2 shows an example of a switching device 1 in which a control device as shown in FIG. 1 is applied. The switching device 1 has a multiple of input ports 21–23 each connected to one or more sources (not shown). The invention is of course not limited to the depicted number of input ports 21–23, but for the sake of simplicity only three are shown.

Directly connected to the input port 21 is a classifier device 31. The classifier device 31 determines the type (voice, video, computer data, etc.) of the incoming data packets, and, depending on the incoming data packet type, routes the incoming data packet to meter device 41 or a further meter device 42. Such discrimination between data types makes it possible to send different types of data via different paths and to take into account certain transmission priorities. Note, that different type of data packets may be subjected to different settings of SLA, whereby the described discrimination allows to take into account these different SLA settings. It is possible to connect the other input ports 22–23 to a similar classifier device 31. However, it is not necessary to connect any of the input ports 21–23 to such a classifier device 31.

The meter devices 41–48 are further connected to marker devices 121–128, which marker devices are further connected to dropper devices 61–68. These marker devices for example mark data packets as 'discardable' or 'non-discardable' depending on the result of the metering. The dropper devices 61–68 eliminate data packets depending on the result of the metering, the marking of the packets or if the queues 81–88 become congested.

Each of the meter devices 41–44 measures the incoming data rate and compares this rate with a predetermined data rate. This can be done by using a leaky bucket algorithm, as is commonly known in the art, for example from said 'Kowalk' article, or a so called token bucket algorithm.

In a leaky bucket algorithm, the state of a counter (bucket), not shown, is decreased at set times (the bucket leaks) and the state of the counter is increased in proportion to the amount of incoming data packets (the bucket is filled). If the state of the counter exceeds a predetermined threshold value, incoming data packets can be eliminated and the bpws is sent. If the counter drops below another predetermined threshold value, the bpcs is sent.

In a token bucket algorithm, a counter (the bucket), not shown, is increased on set times (a token is added to the bucket) and the counter is decreased by the amount of incoming data packets (tokens are taken form the bucket). If the state of the counter decreases below a predetermined threshold value incoming data packets can be eliminated and the bpws is sent. The maximum of tokens in the bucket is equal to the predetermined burst rate. If the counter exceeds an other predetermined threshold, the bpcs is sent.

Note that the metering can consist of several leaky bucket and token bucket algorithms, each comparing the data flow to a specific rate. See for example Internet Engineering Task Force (IETF) Request For Comment (RFC) 2698 for an example with two data rates: PIR and CIR. Note furthermore that several thresholds can be associated with leaky bucket and token bucket algorithms. See for example IETF RFC 2697 for an example with two thresholds (called 'burst sizes'): Committed Burst Size (CBS) and Excess Burst Size (EBS).

The creation of the bpws and bpcs signals can be associated with the same or different token bucket or leaky bucket algorithms. As an example: one token bucket rate controller can control both the dropping of incoming packets as well as the creation of bpws and bpcs signals. This token bucket rate controller is filled with tokens according to the Peak Information Rate and decreased according to the amount of data packets. The maximum number of tokens in this token bucket rate controller is the burst size (RFC 2698). In case the number of tokens drops below the bpws threshold, an bpws signal is generated. In case the number of tokens becomes zero (the bucket gets empty), incoming packets are dropped. In case the number of tokens exceeds the bpcs threshold, a bpcs signal is generated.

It is possible to use a separate meter device 41–48 for each source, but it is equally possible to use a meter device in a time shared manner for a multiple of sources, as is described in the above mentioned article.

It should be apparent that the invention is not limited to the described types of meter devices 41–48 and marker devices 121–128 and that other types of meter and marker devices can be applied as well, as long as they are able to compare the incoming data rate with a predetermined data rate.

Furthermore it should be apparent that the invention is not limited to a switching device 1 as specifically shown in FIG. 2. For example, the marker devices 121–128 might be omitted. Furthermore, extra functions might be added to the switching device 1. For example, administrative functions to be able to (re-) negotiate the Service Level Agreement (e.g. in terms of data rates and burst sizes) might be added.

After metering, marking and possible dropping, the incoming data packets are transmitted into the switching fabric 5. The switching fabric 5 determines to which output port 101–103 an incoming data packet has to be sent to and transmits at an output side 52 the incoming data packet to the designated output port 101–103.

Exactly the same mechanism for generating the bpws and bpcs signals as described above for the input side 51 may be applied at the output side 52 of the switching fabric with classifier device 32, meter devices 45–48, dropper devices 65–68, queues 85–88, output ports 101–103, bpws/bpcs generator devices 115–118 and marker devices 125–128. An algorithm has to be included in this case to determine to which input port(s) the bpws and bpcs signals have to be sent. Such an algorithm might be marking the incoming data packets at the input ports 21–23 with corresponding input port and source address fields, whereby the bpws/bpcs generated by devices 115–118 will include these fields. It should be apparent though, that an exemplary embodiment constructed according to an aspect of the invention may incorporate a switching device 1 with an bpws/bpcs generating mechanism at one side of the switch 5 only.

Metering on the output 52 side of the switching fabric 5 can be useful in case of contractual limitation of the data rate on any of the output ports 101–103. For example, the operator of the switching device 1 can be different from the operator(s) of the network(s) the output ports 101–103 are connected to. If the operator of the switching device 1 is bound by contract to a certain maximum outgoing data rate, the predetermined data rate of the meter device and marker devices 45–48 can be set to be this outgoing data rate, thereby preventing the operator of the switching device 1 to violate his contract.

It should be apparent to the worker in this field of art that the invention is not limited to implementation in the disclosed example of a physical device, but can likewise be applied in another device. In particular, the invention is not limited to physical devices but can also be applied in logical devices of a more abstract kind or in software performing the device functions. Also the invention is not limited to a switching device as described, but the invention can be applied in any network device that includes a meter device. For example the invention can be applied in a router, a network server computer or a stand alone meter device.

We claim:

1. A method for controlling data flow in a data network including:
    measuring a source specific incoming data rate of incoming data from a specific source;
    comparing the source specific incoming data rate with at least one corresponding predetermined data rate;
    if the source specific incoming data rate does not exceed the predetermined data rate, transmitting the incoming data further,
    wherein a backpressure warning signal (bpws) is generated if the source specific incoming data rate exceeds at least one of the predetermined source specific data rates and said generated backpressure warning signal (bpws) is sent to said source of the incoming data,
    wherein the source specific incoming data rate is compared with a predetermined Peak Information Rate and a predetermined Committed Information Rate, which Committed Information Rate is lower than said Peak Information Rate,
    wherein incoming data packets are marked depending on the result of the comparison of the source specific incoming data rate with said Committed Information Rate and said Peak Information Rate,
    wherein,
    if the source specific incoming data rate exceeds said Peak Information Rate the incoming data packets are marked 'no priority';
    if the source specific incoming data rate exceeds said Committed Information Rate and does not exceed said Peak Information Rate said incoming data packets are marked 'low priority';
    if the source specific incoming data rate does not exceed said predetermined Committed Information Rate said incoming data packets are marked 'high priority'.

2. A method for controlling data flow as claimed in claim 1, characterised in that said method is performed at an entrance side (51) of a switching device (5) of the network.

3. A method for controlling data flow as claimed in claim 1, characterised in that said method is performed at an output side (52) of a switching device (5) of the network and said bpws is sent to at least one source of data according to a predetermined algorithm.

4. A method for controlling data flow as claimed in claim 1, characterised in that,
    the incoming data packets marked 'no priority' are eliminated, and
    if an incoming data flow exceeds a transport capacity of the switching device (1) the incoming data packets marked 'low priority' are at least partly eliminated so as to reduce the incoming data flow below the transport capacity, and
    if after elimination of all incoming data packets marked 'low priority' the incoming data flow still exceeds the transport capacity, the incoming data packets marked 'high priority' are at least partly eliminated.

5. A method for controlling a data flow as claimed in claim 1, characterised in that the source specific incoming data rate is determined by increasing a counter value in correspondence with a period of time elapsed after a previous change of said counter value and decreasing the counter value in correspondence with the number and/or size of incoming data packets, wherein a backpressure warning signal (bpws) is sent if the counter value is less than a predetermined threshold value.

6. A method for controlling a data flow as claimed in claim 1, characterised in that the source specific incoming data rate is determined by increasing a counter value in correspondence with a period of time elapsed after a previous change of said counter value and decreasing the counter value in correspondence with the number and/or size of incoming data packets, wherein a backpressure clearance signal (bpcs) is sent if the counter value exceeds a predetermined threshold value.

7. A method for controlling a data flow according to claim 6, characterised in that the backpressure clearance signal (bpcs) is formed by a PAUSE control signal transmitted to said source via a full duplex connection.

8. A method for controlling a data flow according to claim 6, characterised in that both said backpressure warning signal (bpws) and said backpressure clearance signal (bpcs) are formed by a single PAUSE control signal, said PAUSE control signal encoding both a time of sending said backpressure warning signal and a time of sending said backpressure clearance signal.

9. A method for controlling a data flow according to claim 6, characterised in that a backpressure warning signal (bpws) is formed by starting a jamming signal on a half duplex connection and that a backpressure clearance signal (bpcs) is formed by stopping the jamming signal on said half duplex connection.

10. A method for controlling a data flow as claimed claim 1, characterised in that the source specific incoming data rate is determined by decreasing a counter value in correspondence with a period of time elapsed after a previous change of said counter value and increasing the counter value in correspondence with the number and/or size of incoming data packets, wherein a backpressure warning signal (bpws) is sent if the counter value is higher than a predetermined threshold value.

11. A method for controlling a data flow as claimed in claim 1, characterised in that the source specific incoming data rate is determined by decreasing a counter value in correspondence with a period of time elapsed after a previous change of said counter value and increasing the counter value in correspondence with the number and/or size of incoming data packets, wherein a backpressure clearance signal (bpcs) is sent if the counter value is lower than a predetermined threshold value.

12. A method for controlling a data flow as claimed in claim 1, characterised in that a backpressure clearance signal (bpcs) is sent a predetermined time period after sending the backpressure warning signal (bpws).

13. A method for controlling a data flow according to claim 1, characterised in that the backpressure warning signal (bpws) is formed by a PAUSE control signal transmitted to said source via a full duplex connection.

14. A method for controlling data flow as claimed in claim 1, characterised in that before comparing the source specific incoming data rate with the predetermined data rate, a data type of the incoming data packets is determined, and in that for the incoming data packets a transmission path through the switching device is selected depending upon the determined data type, and a source and type specific data rate is compared with a predetermined data type specific data rate.

15. A control device for controlling data flow including:
at least one input port (21–23);
at least one meter device (41–48) for comparing a source specific incoming data rate of incoming data with at least one predetermined contract rate, said at least one meter device (41–48) being connected to the input port and;
at least one output port,
wherein
the control device further includes at least one backpressure warning signal generator device (111–118) for transmitting a backpressure warning signal (bpws) to a source of the incoming data if the source specific incoming data rate exceeds a predetermined contract rate, said at least one backpressure warning signal generator device (111–118) being connected to at least one input port (21–23) and the meter device (41–48),
wherein said predetermined contract rates include a Peak Information Rate and a Committed Information Rate.
wherein said meter device (41–48) is further connected to a marker device (121–128), for marking incoming data depending on the comparison with said Peak Information Rate and said Committed Information Rate.
wherein said marker device (121–128) is a two rate marker, for marking incoming data packets
'no priority' if the source specific incoming data rate exceeds said Peak Information Rate;
'low priority' if the source specific incoming data rate exceeds said Committed Information Rate and does not exceed said Peak Information Rate;
'high priority' if the source specific incoming data rate does not exceed said predetermined Committed Information Rate.

16. A control device as claimed in claim 15, characterised in that said at least one backpressure warning signal generator device (111–118) includes a backpressure clearance signal generator device for transmitting a backpressure clearance signal (bpcs) to said source after said backpressure warning signal is sent.

17. A control device as claimed in claim 15, further including a dropper (61–64) connected to said meter (41–48), for dropping incoming data packets depending on their marking.

18. A switching device (1) including:
at least one input port (21–23),
switching means (5) connected at an input side (51) of the switching means (5) to at least one of the input ports (21–23); and
an output port (101–103) connected to an output side (52) of said switching means (5), at which output side (52) the incoming data packets are transmitted from the switching means (5) into the network, and further including
at least one control device according to claims 18, said control device being connected to said switching means (5).

19. A switching device (1) as claimed in claim 18, characterised in that said control device is connected to an input side (51) of said switching device (5).

20. A switching device (1) as claimed in claim 18, characterised in that said control device is connected to an output side (52) of said switching device (5).

21. A switching device (1) as claimed in claim 18, further including a classifier device (31,32) for determining a data type of the incoming data packets and sending said incoming data packets to a corresponding meter device (41–48) depending on the data type, said classifier device (31,32) being connected to at least one input port (21–23).

22. A switching device (1) as claimed in claim 18, further including a classifier device (31,32) connected to the output side (52), said classifier device (31,32) also being connected to at least two droppers (61–68), each connected to a queue device (81–88).

23. A switching device (1) as claimed in claim 22, further including a scheduler device (9) for selecting a queue device (81–88) depending on the type of incoming data packets in that queue device (81–88) and sending the incoming data packets in that queue device (81–88) to the output port (101–103), said scheduler device (9) being connected to the output port (101–103) and the queue devices(81–84).

* * * * *